July 6, 1937.  W. J. McILVANE  2,086,135
METHOD OF MAKING A METAL-CLAD ROD
Filed June 22, 1935  2 Sheets-Sheet 1
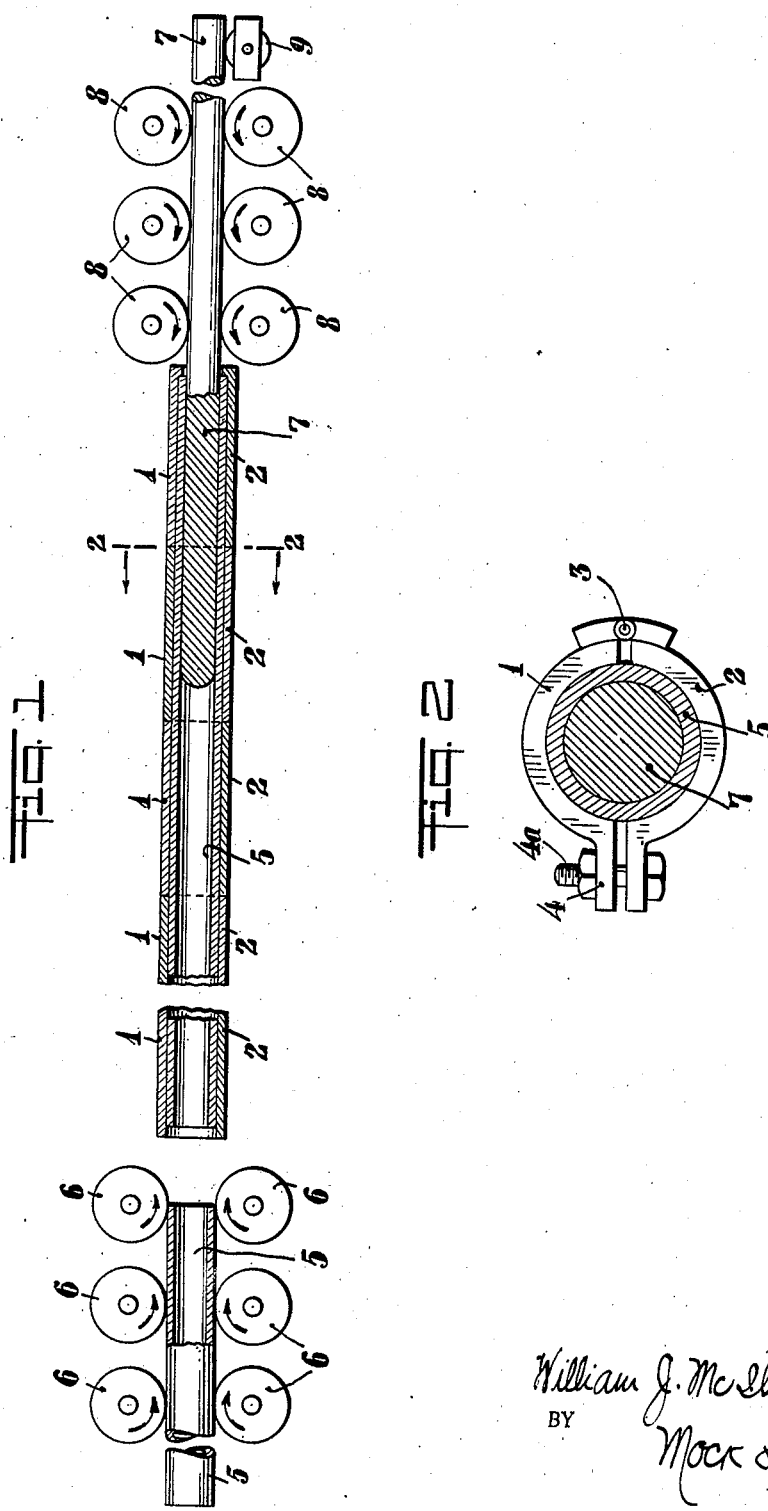
INVENTOR.
William J. McIlvane
BY
Mock & Blum
ATTORNEYS

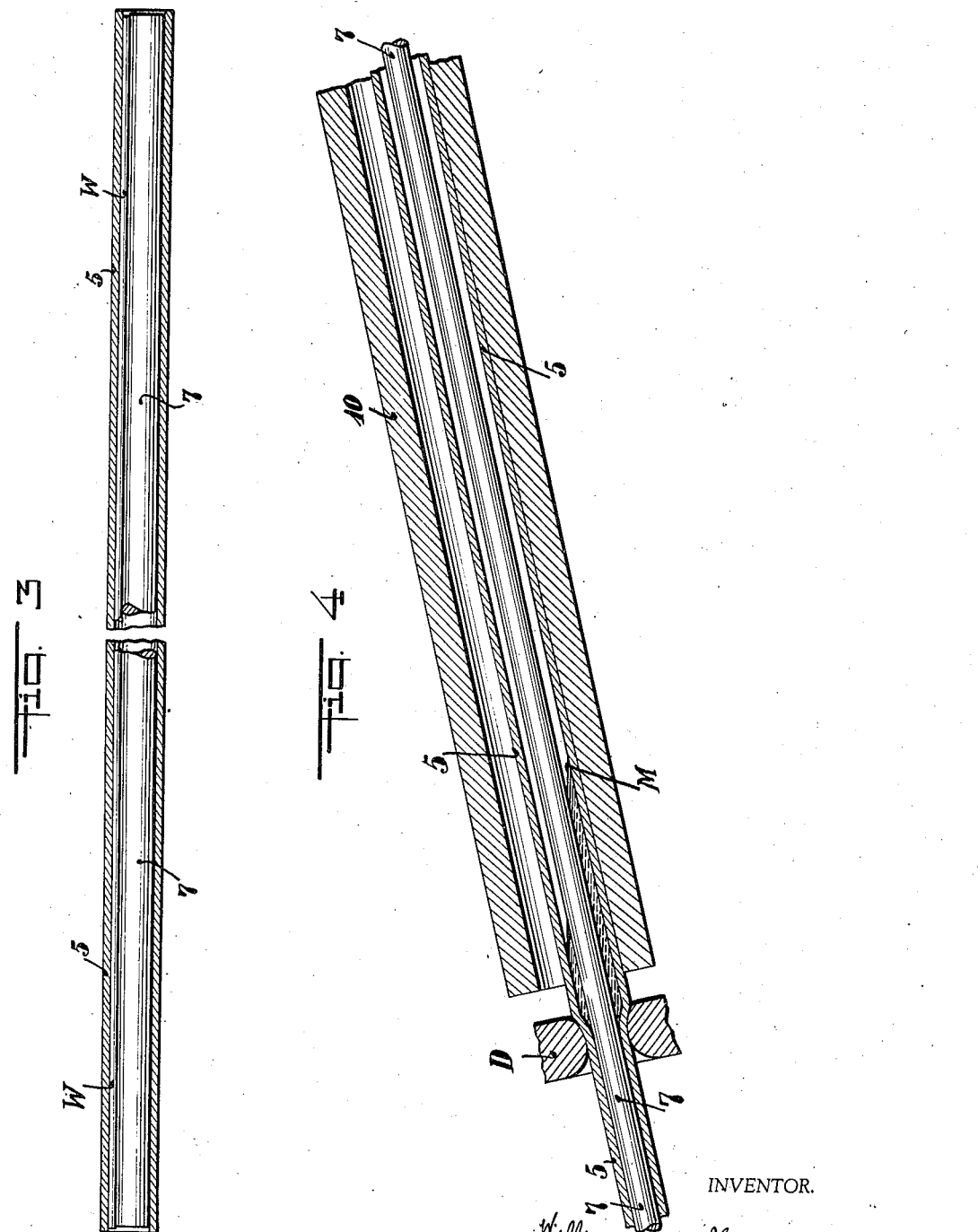

Patented July 6, 1937

2,086,135

UNITED STATES PATENT OFFICE 2,086,135

METHOD OF MAKING A METAL-CLAD ROD

William J. McIlvane, Bellerose, N. Y.

Application June 22, 1935, Serial No. 27,833

3 Claims. (Cl. 29—188)

My invention relates to a new and improved metal-clad rod or the like, and to a new and improved method of making the same.

One of the objects of my invention is to provide an improved article of this type, having a core made of one metal and a covering jacket or exterior layer made of another metal, said core and said exterior layer being brazed to each other.

The exterior layer or shell may be made of copper, stainless steel, bronze, or the like, and the core may be made of steel or of any other metal or alloy.

Another object of my invention is to provide a device of this type and a method of making the same, in which the outer layer is of uniform thickness, the composite article having a cross section and length which is suitable for direct wire drawing so that I can eliminate any rolling operation for reducing the article to the size which is suitable for direct wire drawing. Whenever I refer to direct wire drawing, I refer to the elimination of all reducing operations, either by rolls or dies, prior to pulling the composite blank through wire drawing dies.

Another object of my invention is to provide an improved method whereby a long rod (preferably solid) of one metal is inserted into a long tube of another metal, the core in the rod and the said tube being then brazed to each other. During the brazing operation I prefer to reduce the clad rod to a diameter which is suitable for direct wire drawing.

Other objects of my invention will be set forth in the following description and drawings which diagrammatically illustrate the form of apparatus which can be used for carrying out the invention, it being understood that the above statement of the objects of my invention is intended to generally explain the same without limiting it in any manner.

Fig. 1 is a longitudinal section partially in elevation.

Fig. 2 is a cross section on the line 2—2 of Fig. 1.

Fig. 3 is a sectional view showing the assembly of the outer tube, the core and the alloy wire.

Fig. 4 illustrates the furnace which is used, and the welding operation.

Metal-clad rods, having outer metal jackets connected to cores, have been made on a large scale for many years. The first operation in making such rods on a commercial scale, has been to cast the outer metal (such as copper) around the core (such as steel) in order to form a clad ingot of relatively large diameter and of small length. It was then necessary to hot-roll said ingot in order to reduce its diameter, so as to obtain a rod whose diameter was sufficiently small for direct wire drawing.

The casting of the molten metal around the core, resulted in the contamination of the molten metal (such as copper) by the solid metal of the core. The cast metal was allowed to cool slowly, until it had solidified, and this slow cooling permitted said contamination.

If the old method was utilized in order to make a copper-clad rod, this contamination resulted in a partial loss of the electrical conductivity of the copper. Likewise the hot rolling of the clad ingot produced a rod in which the core was nonconcentric with the outer layer or jacket, and the outer layer was not of uniform thickness.

Furthermore, in manufacturing a copper-clad rod by the old casting method, it was necessary to use a core made of low carbon steel, containing an alloying element in order to provide the necessary tensile strength for the core, since copper cannot be successfully welded to high carbon steel by the old casting method.

According to my invention I can produce a metal-clad rod in any desired length and of a diameter suitable for wire drawing, with the elimination of hot rolling, and with the outer metal layer securely welded to the inner metal core. Likewise the core is a true cylinder and it is concentric relative to the jacket, and the jacket is of uniform thickness.

If copper or other metal is used for making the jacket, contamination thereof is prevented. Likewise I can use a core made of high carbon steel.

I prefer to operate my method with the use of tubing (made of copper or other metal) whose length is not less than 150 feet. I prefer to have the core of circular cross section, the core being continuous and having a length which is not less than 150 feet.

I can use continuous tubing of any desired length, and I can also use a core of any desired length.

As an example, the outer tube may have an outside diameter of about three-quarters (¾) of an inch. I then use a core having a diameter of about one-half (½) of an inch, although other dimensions can be utilized.

The diameter of the core should be somewhat smaller than the inside diameter of the tube.

Referring to said specific example, the diameter of the core may be about one-eighth of an inch less than the inside diameter of the tube, although this spacing can be varied.

The tube 5 which is utilized can be originally in coiled form for easy handling, and said tube should be carefully cleaned so that it is free from dirt and grease, scale, etc., especially at the interior thereof. Said tube is straightened from the coil by means of the straightening and feeding rolls 6, which feed the straightened tube 5 into tube clamps.

As shown in Fig. 2, these tube clamps are of tubular shape, having body sections 1 and 2 which are connected by means of hinges 3. The sections 1 and 2 are provided with ears 4 which can be forced towards each other by means of a bolt 4a and a cooperating nut.

When the tube 5 is initially pushed into the tube clamps, the bolts 4a are adjusted so that there is a relatively loose fit between the tube 5 and the tube clamps, so that the tube 5 can be inserted into said clamps with little or no force.

The respective tube clamps are in perfect alignment with each other so that a sufficient straight length of the tube (150 feet or more) is located within the aligned tube clamps.

The bolts of the tube clamps are then operated so as to tightly grip the tube 5 and to hold it in the absolutely straight condition, without any curved or buckled parts.

The core rod 7 may also be originally in coiled form, and it is also carefully cleaned, so as to remove dirt, grease, scale, etc. The core rod 7 is guided over a roller 9 and it is straightened by the feed rolls 8, which push the core rod 7 into the interior of the tube 5.

As previously stated, the core rod 7 need not fit tightly within the tube 5, so that the core rod 7 can be inserted with the use of very slight or no force. As the core rod 7 is inserted into the interior of the tube 5, a piece of alloy wire W, such as brazing wire, is inserted into the tube, and between the tube and the core. This brazing wire may be made of any suitable metal or alloy and it has a lower melting point than either the core or the tube, and it may be of the same length as the core and tube. Said wire W may be coiled helically around the core. I prefer to braze the jacket to the core, although the invention is not limited to brazing, in certain aspects thereof.

If desired, this brazing wire may be secured to the core, so that the feeding of the core into the tube carries along the brazing wire, or the brazing alloy may be introduced into the tube in the form of finely granulated brazing solder or the brazing alloy may be melted and poured into the open top of the tube 5 after the tube 5, containing the core 7, has been inserted in the inclined furnace 10. If desired, the brazing alloy may be sprayed on the core by means of a metal spray gun before the core is inserted in the tube, or the core may be coated with brazing alloy by passing it through a molten bath of alloy before the core is inserted into the tube.

If the tube 5 is made of copper and the core 7 is made of steel, the brazing alloy should have a melting point which is not higher than 900° C.

Referring to the specific example which has been previously given, in making such an assembly, the diameter of the brazing wire should be about .102 inch.

These instructions will enable any person skilled in the art to determine the correct size of brazing wire, in case the thickness of the tube and of the core are varied.

The core and the tube may be heated in a neutral or reducing atmosphere. If the core and tube are to be heated in the air, the core rod and the alloy wire are coated with a suitable flux, before they are inserted within the tube 5. The use of a reducing or neutral atmosphere makes a flux unnecessary.

After the tube and the core and the alloy wire have been assembled, the assembly is placed in an inclined furnace 10 having at least the same length as the tube. During the heating operation the core and the tube are maintained reasonably straight, and this may be done by any suitable means, such as the tube clamps or the like. The assembly is heated in the furnace 10 to a temperature which is sufficient to melt the welding alloy, without melting the tube or core.

Prior to the heating, the lower end of the tube 5 is closed by any suitable means, so as to prevent the molten brazing alloy M from escaping out of the tube.

As the brazing alloy is melted, it flows to the closed lower end of the tube 5. When the tube, core, and the brazing material have reached the necessary brazing temperature, the bottom end of the tube and core are pulled downwardly, out of the furnace, and they are pushed or pulled through the reducing die D. This results in compressing and elongating the tube and brazing the tube and core together. The brazing alloy solidifies very rapidly when the assembly is passed through the cool die D, so that the brazing is accomplished with simultaneous reduction of the shell. Since the adjacent surface of the shell and core are clean metal surfaces, free from oxidation, they can be readily welded or brazed. The die D can reduce the diameter of the core if desired, in addition to reducing the tube, although this is not necessary in all cases.

Hence the action of the die and of the molten brazing alloy is to weld the tube and core to each other, and if desired, to reduce the diameter of the core of the clad rod. The welding or brazing pressure which is exerted by die D may be as high as desired.

The welded or brazed assembly can then be reduced, either while it is hot or after it has cooled, by passing it through any desired number of reducing dies of the type used in wire-drawing, thus making copper-clad wire or copper-clad rod of any desired thickness.

Since the reduction in thickness of the tube may be slight, the jacket can be finally formed of substantially constant thickness throughout, and the core is concentric relative to the jacket.

If the core, solid or hollow, is made of high carbon steel and the jacket is made of copper, the temperature of the furnace should be about 950° C.

Since the die is near the outlet of the furnace, the molten brazing alloy is prevented from solidifying up to the mouth of the die D, because part of the tube remains within the furnace up to substantially the end of the operation, and this part of the tube and core are heated.

By having the welding temperature or brazing temperature sufficiently low, performing the heating operation with sufficient speed, and then drawing the assembly through the die with sufficient rapidity, so as to produce rapid cooling any substantial contamination of the metal of the tube by the metal of the core can be prevented.

In the completed article, the tube and the core has an intermediate and very thin layer of the brazing material.

Whenever I refer to welding or the like, I wish to include any process (other than casting) in which a heat treatment is utilized in order to connect the core to the interior of the tube.

I have shown a preferred embodiment of my invention but it is clear that numerous changes and omissions can be made without departing from its spirit.

Whenever I refer to welding in the claims, it is to be understood that the outer tube is in the unmolten condition as distinguished from the old casting process, in which the molten copper or the like was allowed to come into contact with the core.

Likewise, whenever I refer to a solid core or a rod in the claims or elsewhere, I include a hollow core of any kind, including a tubular core.

If desired, the core could be made of copper, such as copper tubing, having a jacket made of steel or other metal or alloy which has the same or a higher melting point than the core.

In using a drawing die as previously described there is a tendency for the jacket to creep relative to the core.

Hence I can connect the jacket to the core by a quenching method. The core is first given a thin coating of brazing material by means of a spray gun which can spray the brazing material in molten form, so that a thin solid layer of said brazing material is formed. The thickness of this layer may be 0.003 inch. The core, thus coated, is inserted into the jacket, and the assembly is given a single cold draft through a drawing die, just sufficient to tighten the jacket on the core. In said cold draft, the jacket can be compressed, if desired.

The jacket and core are thus brought into intimate contact, since the intermediate layer of brazing material is very thin.

The assembled jacket and core are then heated in the manner previously described, so as to melt the brazing material without melting either the jacket or the core. The temperature may be just sufficient to melt the brazing alloy. As the heated assembly is withdrawn from the furnace, it is subjected to a cold water spray or other cooling treatment, external to the furnace. The sudden contraction of the jacket, due to the external cooling thereof, will cause it to contract suddenly, so that it will grip the core. Since the jacket has a snug fit on the core, and since the jacket is rapidly contracted by the sudden cooling, the brazing material will not run out. Likewise, by heating the assembly and performing the brazing or welding with sufficient rapidity, the core will not contaminate the jacket. This method may be designated as a species of brazing or welding.

I claim:

1. A method of making a metal-clad core, which consists in assembling a tube with the core and with welding material, heating the assembly so as to melt the welding material without melting either the tube or the core, and while retaining the molten welding material within the tube, and then reducing the size of the tube so as to weld its interior to the core and while the welding material is in the molten condition.

2. A method of making a metal-clad core which consists in assembling a tube with the core and with an intermediate brazing material, heating the assembly so as to melt the brazing material without melting either the tube or the core, reducing the size of the tube while retaining the molten brazing material within the tube in molten form and then causing the molten brazing material to solidify.

3. A method of making metal-clad rod which consists in straightening flexible and coiled metal tubing, straightening flexible and coiled metal core, inserting the core within the tube without substantial force so that the flexible core can enter the tube without substantial deformation of the core, introducing brazing material between the tube and the core, heating the assembly until the brazing material melts while simultaneously reducing the size of the tube while said material is in the molten condition and then causing the brazing material to solidify, the assembled tube and core being of sufficient length and of sufficiently small diameter to enable the assembly to be passed directly through a wire drawing machine.

WILLIAM J. McILVANE.